(12) United States Patent
Veon

(10) Patent No.: US 10,567,698 B2
(45) Date of Patent: Feb. 18, 2020

(54) NO TECH TV

(71) Applicant: James Veon, Upper Marlboro, MD (US)

(72) Inventor: James Veon, Upper Marlboro, MD (US)

(*) Notice: Subject to any disclaimer, the term of this patent is extended or adjusted under 35 U.S.C. 154(b) by 0 days.

(21) Appl. No.: 16/106,998

(22) Filed: Aug. 21, 2018

(65) Prior Publication Data
US 2019/0222794 A1    Jul. 18, 2019

Related U.S. Application Data

(63) Continuation of application No. 15/869,762, filed on Jan. 12, 2018, now abandoned.

(51) Int. Cl.
H04N 5/64 (2006.01)
A47B 81/06 (2006.01)
H04N 5/44 (2011.01)

(52) U.S. Cl.
CPC ............. *H04N 5/64* (2013.01); *H04N 5/44* (2013.01)

(58) Field of Classification Search
None
See application file for complete search history.

(56) References Cited

U.S. PATENT DOCUMENTS

| 8,793,407 | B2* | 7/2014 | Jeon | G09G 5/006 |
| | | | | 345/205 |
| 2004/0165119 | A1* | 8/2004 | Choi | H04N 5/44 |
| | | | | 348/839 |
| 2011/0273632 | A1* | 11/2011 | Casey | G06F 1/1601 |
| | | | | 348/839 |
| 2013/0169892 | A1* | 7/2013 | Park | G09G 5/003 |
| | | | | 348/839 |
| 2014/0218627 | A1* | 8/2014 | Wu | H04N 5/655 |
| | | | | 348/839 |
| 2016/0255301 | A1* | 9/2016 | Vadura | H04N 5/64 |
| | | | | 348/839 |

* cited by examiner

*Primary Examiner* — Chikaodili E Anyikire
(74) *Attorney, Agent, or Firm* — Dunlap Bennett & Ludwig PLLC

(57) ABSTRACT

A modular television with removable peripheral hardware components for simple service and repair thereof.

1 Claim, 5 Drawing Sheets

NO TECH TV

CROSS-REFERENCE TO RELATED APPLICATION

This application claims the benefit of priority of U.S. non-provisional application Ser. No. 15/869,762, filed 12 Jan. 2018, the contents of which are herein incorporated by reference.

BACKGROUND OF THE INVENTION

The present invention relates to manufacture and maintenance of electronic devices and, more particularly, to a method of manufacturing televisions for facilitating non-professional maintenance, repair and servicing of the television (TV), while retaining the look, feel, weigh and functionality of a typical industry standard TV found at any electronics store or seller website.

The traditional process of repairing a TV with a hardware malfunction is to call a service organization, either where you made the purchase or a $3^{rd}$ party repair shop that you may know or find on your own. You may need to ship the TV out somewhere to be repaired and returned to you in restored condition, or take it to a shop and drop it off for repair, hopefully receiving it back in working condition after a few days or weeks. A technician might have to make a house call leaving you to deal with a person you may or may not know or trust. Inviting a technician into your home without a background history, or even knowing their location an hour before arrival at your home can be uncomfortable leaving you to wonder, do you leave them to work on their own or do you watch what they do in your home and to your TV?

As can be seen, there is a need for a method of manufacturing televisions for facilitating non-professional maintenance, repair and servicing of the television by providing modular circuit boards for the peripheral hardware components of the television that are prone to malfunction.

SUMMARY OF THE INVENTION

In one aspect of the present invention, a modular television includes a frame having a plurality of peripheral edges; a TV mainboard integral to the frame; a plurality of slots along at least two of each of the plurality of peripheral edges; each slot providing a removable coupling, each removable coupling operatively associated with the TV mainboard; and a plurality of peripheral hardware components, each peripheral hardware component configured to engage a respective slot of the plurality of slots and electrically connect to the respective removably coupling.

In another aspect of the present invention, the modular television includes a frame having a plurality of peripheral edges; a TV mainboard integral to the frame; a plurality of slots along at least two of each of the plurality of peripheral edges; each slot providing a removable coupling, each removable coupling operatively associated with the TV mainboard; a plurality of peripheral hardware components, wherein the plurality of peripheral hardware components provides: a first peripheral hardware component embodying a plurality of firmware connections; a second peripheral hardware component embodying an input panel; and a third peripheral hardware component embodying one or more side panel controls; each peripheral hardware component configured to engage a respective slot of the plurality of slots and electrically connect to the respective removably coupling; each peripheral hardware component includes a flange for fastening to the frame engaging said respective slot; and each peripheral hardware component provides one or a plurality of colors of a color code scheme.

In yet another aspect of the present invention, a method of servicing a television includes the steps of providing the above-mentioned modular television of and replacing one of the plurality of peripheral hardware components when it malfunctions.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
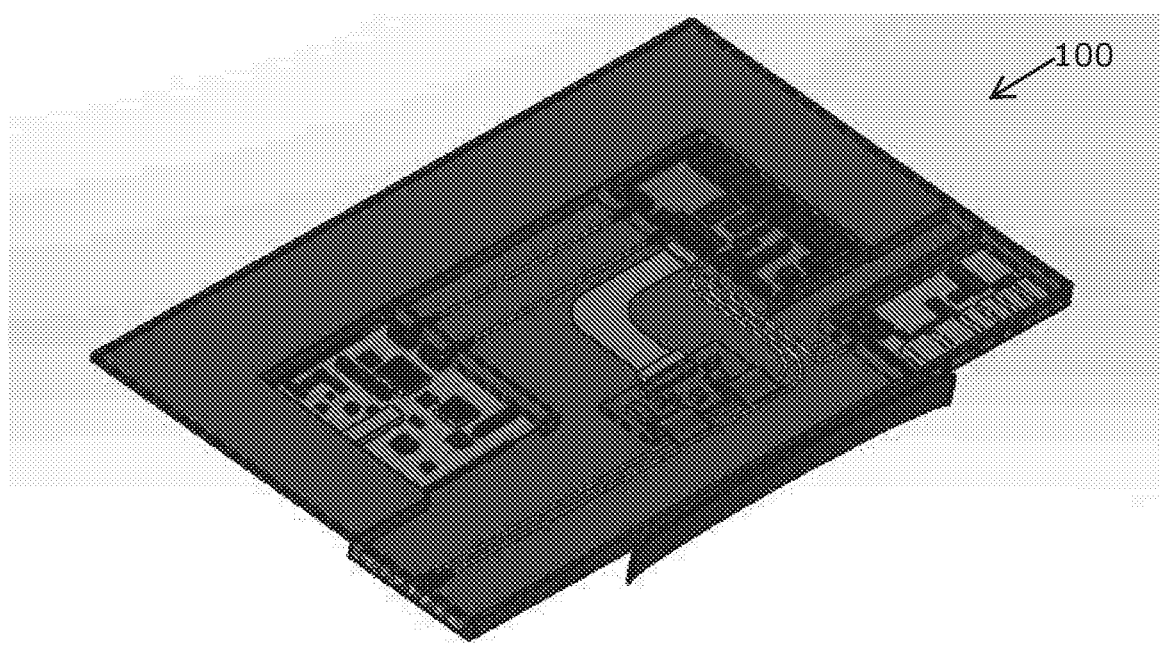
FIG. 1 is a rear perspective view of an exemplary embodiment of the present invention, illustrating a frame 10 adapted to provide a plurality of modular peripheral hardware components 20 and one integral TV mainboard 40 coupled to a screen panel of the NTTV 100, as well as illustrating the internal wiring for carrying related power and data signals between the peripheral hardware components 20 when operatively associated with the frame 10/TV mainboard 40; note, in certain embodiments, the TV mainboard 40 may be modular and removable just like the peripheral hardware components 20.
Figure 2:
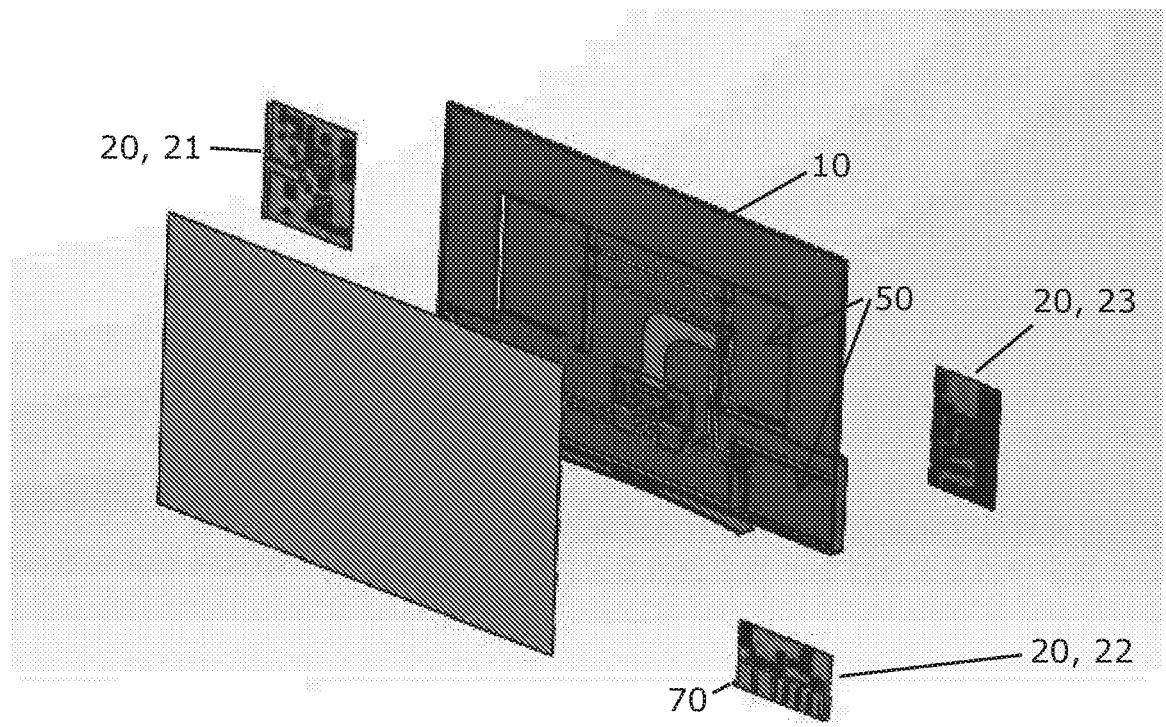
FIG. 2 is an exploded rear perspective view of an exemplary embodiment of the present invention, wherein the modular peripheral components 20 color coded and removed from their slots 50.
Figure 3:
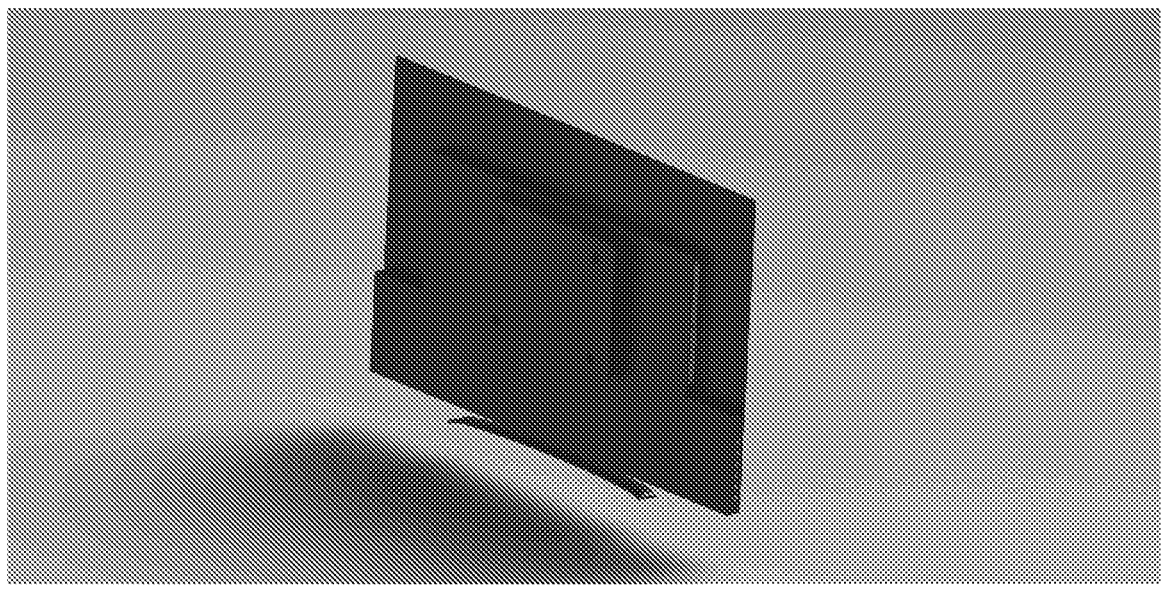
FIG. 3 is a rear perspective view of an exemplary embodiment of the present invention, demonstrating a fully assembled NTTV 100, including a base stand and wall mount compatibility.
Figure 4:
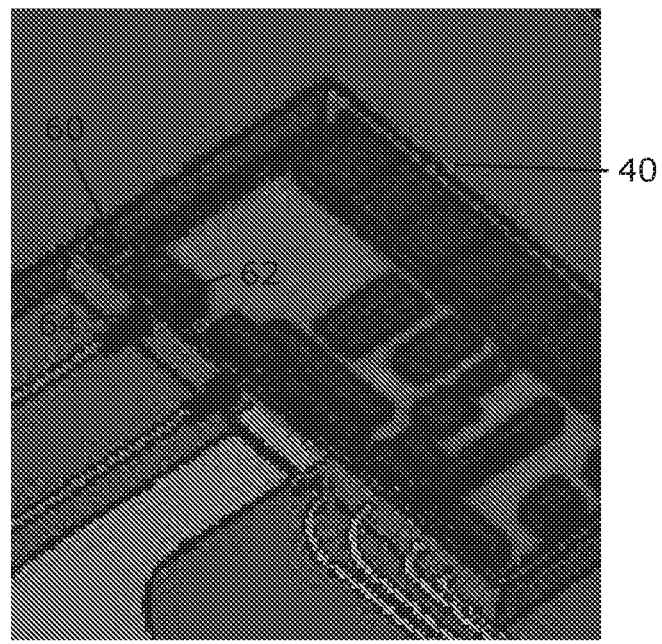
FIG. 4 is a detail perspective view of an exemplary embodiment of the present invention, illustrating a modular peripheral component 20/TV mainboard 40 operatively associated via a removable coupling 60, specifically male connectors 62 operatively associating with female connectors 64 fastened to the frame 10 of the NTTV 100, a similar removable coupling 60 is provided on each peripheral hardware component 20.
Figure 5:
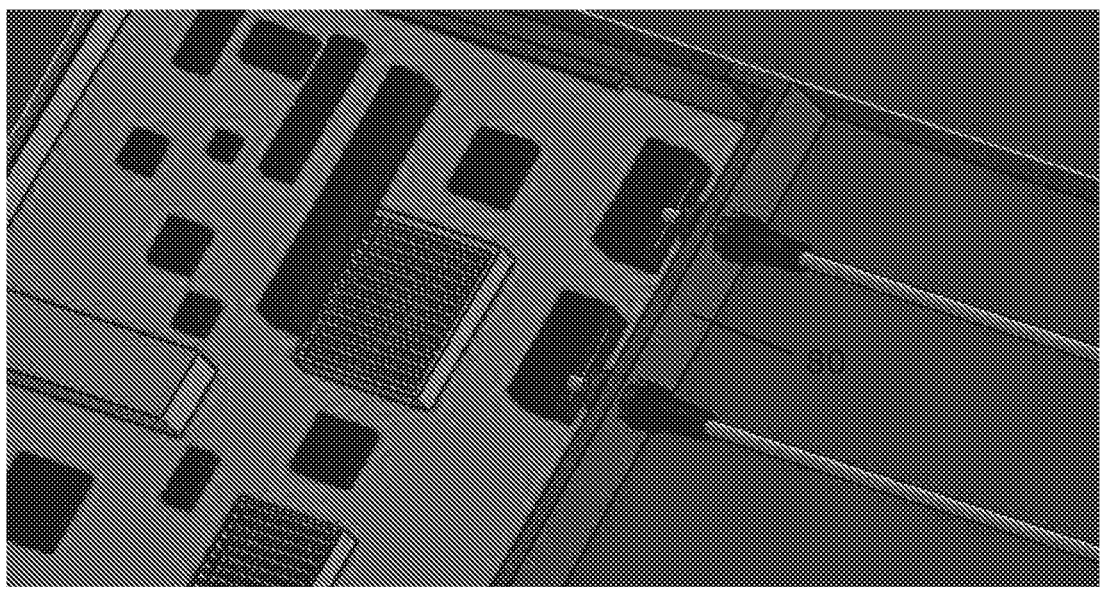
FIG. 5 is a detail perspective view of a power board 80 of an exemplary embodiment of the present invention.

Referring to FIGS. 1 through 5, the present invention may include a No Tech TV (NTTV) 100 providing a plurality of peripheral hardware components 20 removably coupled to an interface with a TV mainboard 40. The removable coupling 60 (of each peripheral hardware component 20 to the NTTV 100) may include, but not be limited to, a male plug 62 to female jack 64 configuration, wherein the female jack 64 is operatively associated to the TV mainboard 40, supported by a frame 10.

1.2 Improvement

The advantage of the removable coupling 60 is to enable a quick yet durable electronic connection that can transmit power and data signal together to run the peripheral hardware components 20 efficiently.

1.3 Description

The TV mainboard 40, like a traditional television, operatively associates and interconnects with essentially every TV input/output hardware component. The TV mainboard 40 is the central processing unit for the input/output signals—e.g., video and sound (i.e., an integrated circuit board that controls voltage)—through traditional hardware connectors such as HDMI, USB, Coaxial, Component, and Composite. Where NTTV 100 differs from traditional TV's is the arrangement of the removable peripheral hardware components 20, which traditionally are the most likely to cause a TV malfunction. As a result, the peripheral hardware components 20 can be easily removed and replaced without taking the NTTV 100 apart, thereby facilitating the maintenance, replacement, repair and serviceability of the NTTV 100 by a non-professional user, saving headaches, cost and time.

1.4 Improvement

The removable coupling 60 device fastener system's advantage is its ability to easily be connected or disconnected by an owner-user to manage and self-service the NTTV 100 themselves. In addition, the TV mainboard 40 will have slots 50 on each side of the frame 10 for an adequate length to make sure the peripheral hardware component 20 seats easily and efficiently without damaging the interface of the plug 62 or jack 64. The jack connection 64 located on the TV mainboard 40 will have a protective plastic jacket, provided by the frame 10, for protecting the pins on the TV mainboard 40 jack and will fit snug over the plug 62.

Each peripheral component 20 provides one or more flanges 70, each providing fastener connections (such as screw holes and screws) to securing said peripheral hardware component 20 to the frame 10 of the NTTV 100 once an operative association (via the removable coupling 60) has be made. In certain embodiments, the fastener to the base unit will be a form fitted flange 70 having 2 screw holes and 2 screws that are permanently seated for quick attaching and detaching without loosening the screw.

A method of using the present invention includes the following. The NTTV 100 disclosed above may be provided. A user may take the following steps:

2.1 Control

With this improvement, if a user determines which peripheral hardware component/s 20 on their NTTV 100 is/are having the trouble—e.g., by using the online help or phone help provided by the NTTV provider or $3^{rd}$ party—the user can rectify the problem much more easily than in the prior art.

2.2 Troubleshooting

A user determines a replacement part (peripheral hardware component 20) based on their diagnosis and the professional opinion of the NTTV provider or $3^{rd}$ party who backs the NTTV 1000 purchased.

2.3 Ordering Replacements

Next the user may order the replacement part (peripheral hardware component 20) based on their urgency to have the part shipped, overnight or ground delivery or possible pick up at a parts distribution center if there is one in your vicinity. When your part arrives you simply disconnect the malfunctioning part (peripheral hardware component 20) and install the new replacement part (peripheral hardware component 20) ordered and received.

2.4 Repairs

The tools needed to do a part replacement will come with the new part and is a small screw driver. Should there be an additional issue with the NTTV 100 the user simply repeats the troubleshooting process until the unit is back to working condition even if it requires replacement the base unit NTTV 100. Because there is a color-coding scheme to assist with part recognition and familiarity, the user will be able to understand more about how their NTTV 100 works and what each components purpose is and how the whole unit operates.

3.1 Malfunctions

TV malfunctions may be caused by a user trying to plug in a HDMI or USB device upside down and shorting out the mainboard 40, plugging in a coaxial cross threaded or shearing off the coaxial connecter all together. Dropping the TV, of course, could cause the screen to crack, base unit to crack or chip, a button or knob on the side manual controls could break off or break inward, plugging in a cable backwards on the bottom input panel could cause that board to malfunction as well or shock back to the TV mainboard 40 or power board 80 also causing any or all of those components to fail or be partially damaged.

3.2 Resolution

A user can quickly resolve a malfunction by having the ability to diagnose what problem occurred with the NTTV 100, reporting the issue and getting a quick turn around by ordering a replacement part and being able to replace the bad part themselves.

As a result, the present invention embodies an improvement in the ability for a user who owns a NTTV 100 to be able to service the device themselves when the above-mentioned hardware malfunction occurs. Specifically, the plurality of modular peripheral hardware components 20 may include a first peripheral hardware component 21 embodying the HDMI, USB, Coaxial Component, and Composite ("firmware") connections. Thus, if one of these connections malfunction, the relevant first peripheral hardware component 21 may be removed. Likewise, if there is a malfunction with the above-mentioned bottom input panel, which may include "add-on" ports, a second modular peripheral component 22 may provide the input panel, enabling the user to remove and replace it in case of malfunction. Similarly, the plurality of modular peripheral hardware components 20 may include a third peripheral hardware component 23 embodying the hardware for the side manual controls.

Moreover, the NTTV will have color coded markings so each peripheral hardware component 20 is recognizable and owner/user can become familiar with the different peripheral hardware components 20 on their NTTV 100 making tech support a positive experience.

Furthermore, the NTTV peripheral components 20 circuit boards will be removable from slots 50 on the edges of the backside of the NTTV frame 10, making such replacement convenient for the untrained user.

It should be understood, of course, that the foregoing relates to exemplary embodiments of the invention and that modifications may be made without departing from the spirit and scope of the invention as set forth in the following claims.

What is claimed is:

1. A television comprising:
   a frame having a plurality of peripheral edges;
   a TV mainboard integral to the frame;
   a plurality of slots along at least two of each of the plurality of peripheral edges;

each slot providing a removable coupling, each removable coupling operatively associated with the TV mainboard;
a plurality of peripheral hardware components, wherein the plurality of peripheral hardware components comprises:
 a first peripheral hardware component embodying a plurality of firmware connections;
 a second peripheral hardware component embodying an input panel; and
 a third peripheral hardware component embodying one or more side panel controls;
each peripheral hardware component configured to engage a respective slot of the plurality of slots and electrically connect to the respective removably coupling;
each peripheral hardware component includes a flange for fastening to the frame engaging said respective slot; and
each peripheral hardware component provides one or a plurality of colors of a color code scheme.

* * * * *